United States Patent [19]

Morita et al.

[11] Patent Number: 4,884,398
[45] Date of Patent: Dec. 5, 1989

[54] METHOD OF AND APPARATUS FOR REDUCING ENGINE SMOKE EMISSIONS

[75] Inventors: Izuru Morita; Keisuke Kishitani, both of Tokyo; Masayoshi Kajitani, Kanagawa; Shoji Tozawa, Akashi; Masanori Satoh, Sagamihara; Kisaburo Otabe, Isehara; Mamoru Onda, Sagamihara, all of Japan

[73] Assignee: Shin Caterpillar Mitsubishi Ltd., Tokyo, Japan

[21] Appl. No.: 217,418

[22] Filed: Jul. 8, 1988

[30] Foreign Application Priority Data

Oct. 19, 1987 [JP] Japan .............................. 62-263589
Oct. 19, 1987 [JP] Japan .............................. 62-263590

[51] Int. Cl.⁴ .............................................. F01N 3/02
[52] U.S. Cl. ...................................... 60/274; 60/285; 60/299
[58] Field of Search ................... 60/274, 285, 286, 299

[56] References Cited

U.S. PATENT DOCUMENTS

| | | | |
|---|---|---|---|
| 3,597,165 | 8/1971 | Keith | 60/299 |
| 4,211,075 | 7/1980 | Ludecke | 60/285 |
| 4,462,208 | 7/1984 | Hicks | 60/286 |
| 4,509,327 | 4/1985 | Enga | 60/285 |
| 4,747,264 | 5/1988 | Santiago | 60/285 |
| 4,756,155 | 7/1988 | Shinzawa | 60/285 |

Primary Examiner—Douglas Hart
Attorney, Agent, or Firm—Robert E. Burns; Emmanuel J. Lobato

[57] ABSTRACT

A method of and apparatus for reducing smoke emitted from a diesel engine are disclosed. The apparatus comprises: a trap for trapping black smoke particles which is disposed within the exhaust system of the engine, the trap including a ceramic trap assembly having a honeycomb structure in which a catalyst which enables lowering of the combustion temperature of black smoke is carried on internal passage walls; a pressure sensor provided at the inlet of the trap; an engine speed sensor; a butterfly valve provided in the intake system of the engine; and a combination of a controller and an actuator for the butterfly valve. In this apparatus and method the controller obtains a specified exhaust pressure range in the trap on the basis of a signal from the engine speed sensor, compares an exhaust pressure signal from the pressure sensor with the specified exhaust pressure range, and controls the actuator so that the actuator controls the degree of opening of the butterfly valve so that the exhaust pressure inside the trap is maintained within the specified exhaust pressure range. By this means, black smoke particles can be controllably burned by means of exhaust gas without causing any engine trouble. Since the trap can be regenerated with the ceramic trap assembly left in place in, for example, a construction machine, it is possible to provide a diesel engine smoke reducing apparatus which is superior in both serviceability and durability.

10 Claims, 6 Drawing Sheets

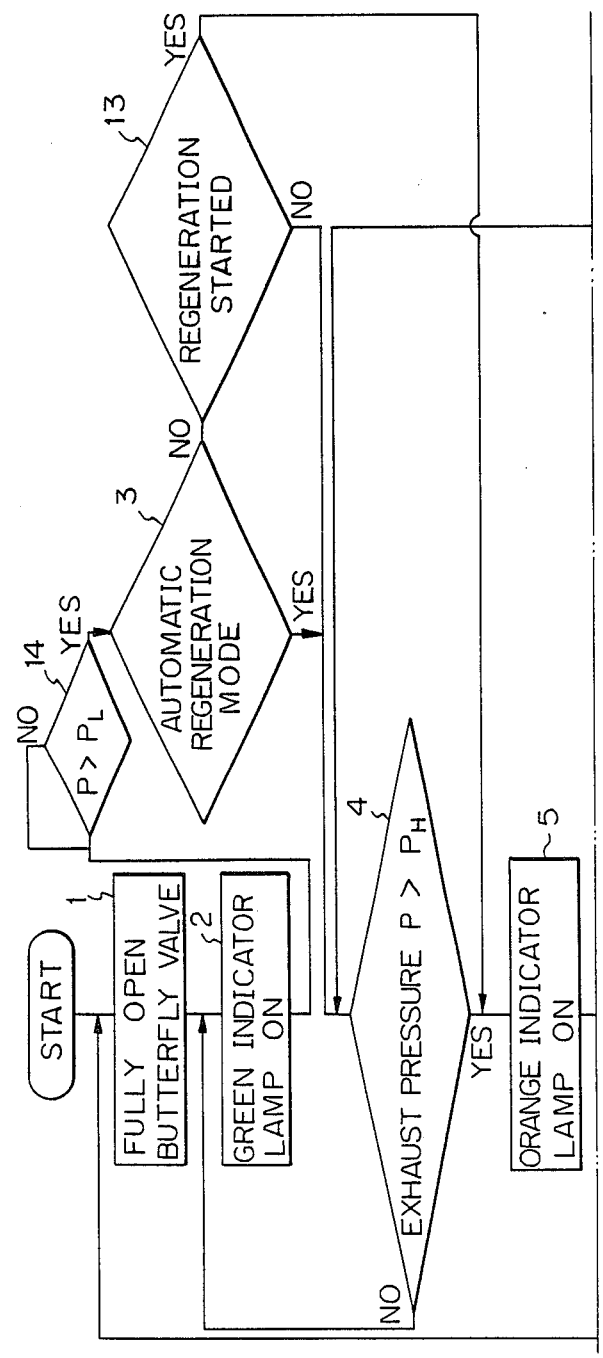

METHOD OF AND APPARATUS FOR REDUCING ENGINE SMOKE EMISSIONS

BACKGROUND OF THE INVENTION:

1. Field of the Invention

The present invention relates to a method of and apparatus for reducing the amount of smoke emitted from a diesel engine.

2. Description of the Related Art

Diesel-engined construction machines designed to operate in enclosed spaces such as tunnels have heretofore been equipped with a so-called catalytic muffler for oxidatively removing such harmful components as HC and CO that are contained in the exhaust gas emitted therefrom. The conventional catalytic muffler i s, however, incapable of removing black smoke particles from exhaust gas, and the fact is that black smoke particles are released into the atmosphere.

To solve this problem, a method has been proposed wherein black smoke particles are trapped by means of a honeycomb type — ceramic filter and the particles trapped in the ceramic filter are burned for regeneration by means of the heat of the exhaust gas. Such a method is, for example, disclosed in "Diesel Particulate Control" in Automotive Engineering, November 1984, page 63 – 70, published by the Society of Automotive Engineers Inc. in 1984, and "Diesel Motorcar Exhaust Gas and Countermeasures therefore" in Machine Research, Vol.39 No.10, page 1103 – 1104, published by the Japan Machinery Institute in 1987. The method disclosed in these prior art publications suggests the use of a catalyst on the walls of gas — flow passages of the ceramic filter in order to lower the combustion temperature of black smoke and throttling of a butterfly valve in order to raise the temperature of the exhaust gas, since the temperature of the exhaust gas is not always sufficient to burn the trapped particles.

These prior arts, however, only teach trapping and burning of the black smoke particles in a conceptional manner and do not teach how an actual system capable of carrying out the method should be realized in an actual vehicle. In an actual vehicle, e.g., a construction machine, if the butterfly valve is throttled too much, the machine would readily stop and operations would have to be discontinued. There has, therefore, been a strong demand for an improved method and apparatus wherein trapping and burning of black smoke particles is automatically controlled without causing any engine trouble so that it will be possible to realize practical system for actual working machines and vehicles which does not disturb the operation thereof.

SUMMARY OF THE INVENTION

In view of the above-described circumstances, it is a primary object of the present invention to provide a method of and apparatus for reducing engine smoke which do not suffer from the above-described disadvantages of the prior art.

To this end, the present invention provides, in one of its aspects, an apparatus for reducing the amount of smoke emitted from a diesel engine, comprising: a trap for trapping black smoke particles which is disposed within the exhaust system of the engine, the trap including a ceramic trap assembly having a honeycomb structure in which a catalyst which enables lowering of the combustion temperature of black smoke is carried on internal passage walls; a pressure sensor provided at the inlet of the trap; an engine speed sensor; a butterfly valve provided in the intake system of the engine; a combination of a controller and an actuator arranged to obtain a specified exhaust pressure range in the trap on the basis of a signal from the engine speed sensor, compare a value representing the exhaust pressure and supplied by the pressure sensor with the specified exhaust pressure range, and control the degree of opening of the butterfly valve such that the exhaust pressure inside the trap is maintained within the specified exhaust pressure range; and an indicator for indicating the exhaust pressure state of the trap.

In another aspect, the present invention provides a method of reducing smoke emitted from a diesel engine, comprising: disposing a trap for trapping black smoke particles in the exhaust system of the engine, the trap including a ceramic trap assembly having a honeycomb structure in which a catalyst which enables lowering of the combustion temperature of black smoke is carried on internal passage walls; providing a pressure sensor at the inlet of the trap; and controlling the combustion rate of black smoke particles in the trap in such a manner that a specified exhaust pressure range in the trap is obtained on the basis of an engine speed signal from an engine speed sensor, a valve representing the exhaust pressure and supplied by the pressure sensor is compared with the specified exhaust pressure range, and when the exhaust pressure inside the trap exceeds the higher-limit value of the specified exhaust pressure range, a butterfly valve is throttled whereas, when the exhaust pressure is equal to or less than the lower-limit value of the specified exhaust pressure range, the butterfly valve is fully opened.

The controller calculates a specified exhaust pressure range in the trap on the basis of the engine speed measured at that time. During an actual operation, when the valve of the exhaust pressure supplied by the pressure sensor is within the specified range, black smoke particles trapped in the trap are burned by means of the exhaust gas. Since it is often the case that the temperature of exhaust gas immediately before the trap exceeds 500° C during an actual operation of a construction machine, the trapped black smoke particles can be satisfactorily burned during an actual operation under the action of the catalyst. However, when the exhaust pressure exceeds the higher-limit value of the specified range because of black smoke particles accumulated in the trap, for example, after a low-load running state has continued for a long time, the indicator indicates this state, and the actuator throttles the butterfly valve, thereby raising the temperature inside the trap, and thus increasing the combustion rate of the black smoke. When the exhaust pressure from the pressure sensor has fallen to the lower-limit value or less, the actuator activates the butterfly valve to open fully so as to return the engine to the normal running state. By this means, black smoke particles can be controllably burned by means of exhaust gas without causing any engine trouble. Also, since the trap can be regenerated with the ceramic trap assembly left in place in the construction machine, it is possible to provide an engine smoke reducing apparatus which is improved in both serviceability and durability.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

One preferred embodiment of the present invention will be described hereinunder in detail with reference to the accompanying drawings.

Figure 1:
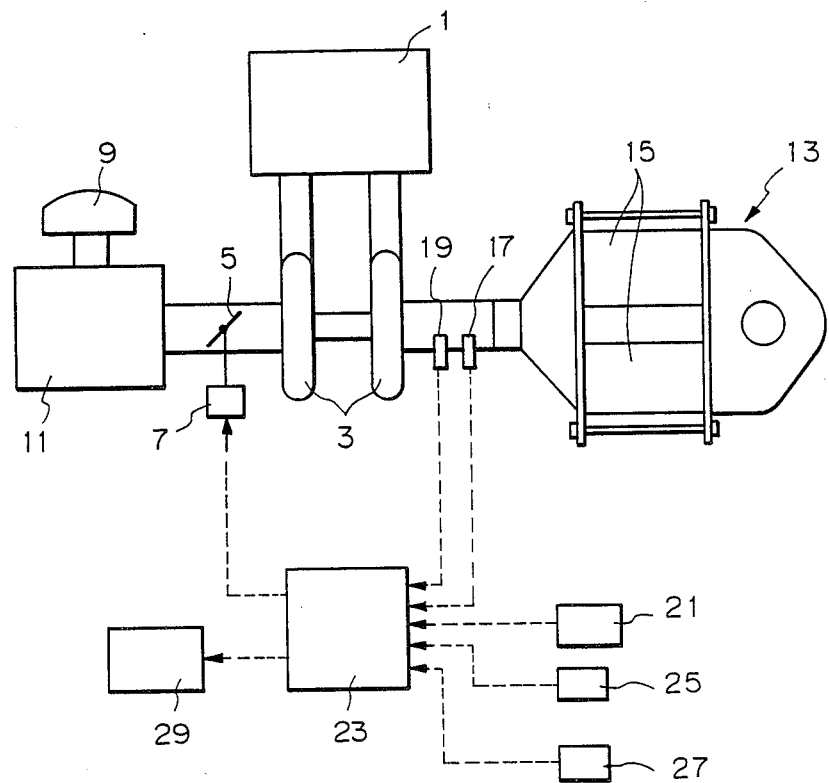
FIG. 1 schematically shows the arrangement of one embodiment of the apparatus according to the present invention.

Referring first to FIG. 1, which shows schematically the arrangement of one embodiment of the present invention, the reference numeral 1 denotes a vehicular engine, 3 turbochargers which are connected to the intake and exhaust systems, respectively, of the engine, 5 a butterfly valve incorporated in the intake system of the engine, 7 an actuator, that is, a solenoid valve, for controlling the degree of opening of the butterfly valve 5, 9 a pre-cleaner, 11 an air filter, 13 a trap which is disposed in the exhaust system of the engine, 15 one or more (two in the illustrated example) ceramic trap assemblies incorporated in the trap 13, 17 a pressure sensor for detecting the exhaust pressure at the inlet of the trap 13, 19 a temperature sensor for detecting the exhaust temperature at the inlet of the trap 13, 21 an engine speed sensor, and 23 a controller which is arranged to obtain a specified exhaust pressure range in the trap 13 on the basis of a signal from the engine speed sensor 21, compare a signal from the pressure sensor 17 with the obtained exhaust pressure range, compare a signal from the temperature sensor 19 with the maximum value of a preset allowable temperature range, and activate the actuator 7 so as to open or close the butterfly valve 5 in accordance with the results of the comparisons. Reference numeral 25 denotes a mode changeover switch for changing over the controller 23 between automatic and manual regeneration modes, 27 a manual regeneration switch for controlling the degree of opening of the butterfly valve 5 when the controller 23 is in the manual regeneration mode, and 29 an indicator for informing the operator of the exhaust pressure and temperature states of the trap 13.

Figure 2:
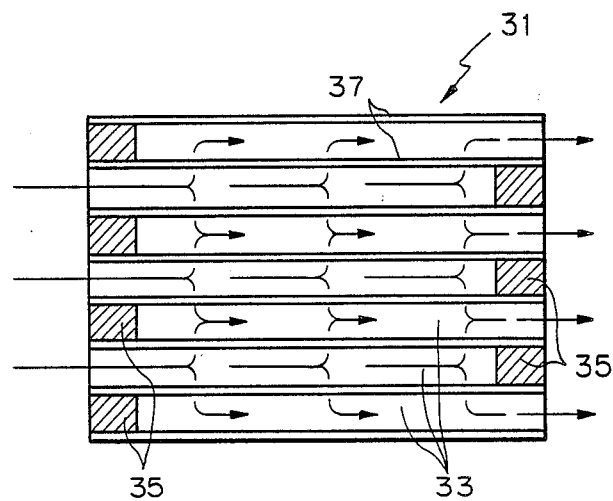
FIG. 2 is a longitudinal sectional view of a ceramic trap member employed in the apparatus shown in FIG. 1.
Figure 3:
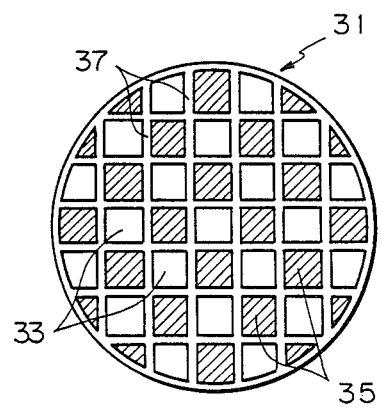
FIG. 3 is an end view of the ceramic trap member shown in FIG. 2.
Figure 4:
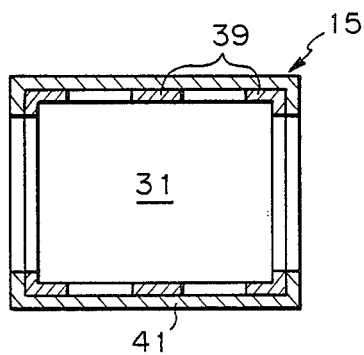
FIG. 4 is a longitudinal sectional view of a ceramic trap assembly employed in the apparatus shown in FIG. 1.

As shown in FIGS. 2 to 4, each of the ceramic trap assemblies 15 which are incorporated in the trap 13 includes a ceramic trap member 31 having a honeycomb structure which is defined by a ceramic material having a substantially cylindrical configuration as a whole and including a multiplicity of internal passages. As for the ceramic material to be employed for the ceramic trap member 31, it is preferable to use a cordierite ceramic material which has excellent heat resistance and is of a type that has been effectively employed for automotive exhaust gas purifying converters. The inlets and outlets of the internal passages 33 are alternately closed with plugs 35. Thus, exhaust gas passes through porous thin walls 37 defining the passages 33 as shown by the arrows in FIG. 2, and black smoke particles contained in the exhaust gas are trapped in the porous thin walls 37. Since the particles thus trapped eventually plug the ceramic trap member 31, they must be burned to regenerate the trap member 31, and it is necessary for this purpose to raise the temperature inside the trap member 31 to the combustion reaction temperature of black smoke particles. To this purpose, in the present invention, a catalyst which enables lowering of the combustion reaction temperature of black smoke particles is carried on the porous thin walls 37 of the ceramic trap member 31 so that black smoke particles are burned by means of the exhaust gas. As the catalyst for this purpose, it is preferable to employ a platinum catalyst containing a component which enables the combustion temperature of black smoke particles to be lowered, suppresses sulfate production and oxidizes harmful components such as HC and CO. The catalyst is carried, for example, by alumina which is coated on the porous thin walls 37 of the ceramic trap member 31. It has been experimentally confirmed that the use of such a catalyst enables black smoke particles to be burned at about 430° C. Since this temperature appears with considerable frequency in the actual operation of an apparatus, it is possible to effect satisfactory self-regeneration.

Figure 5:
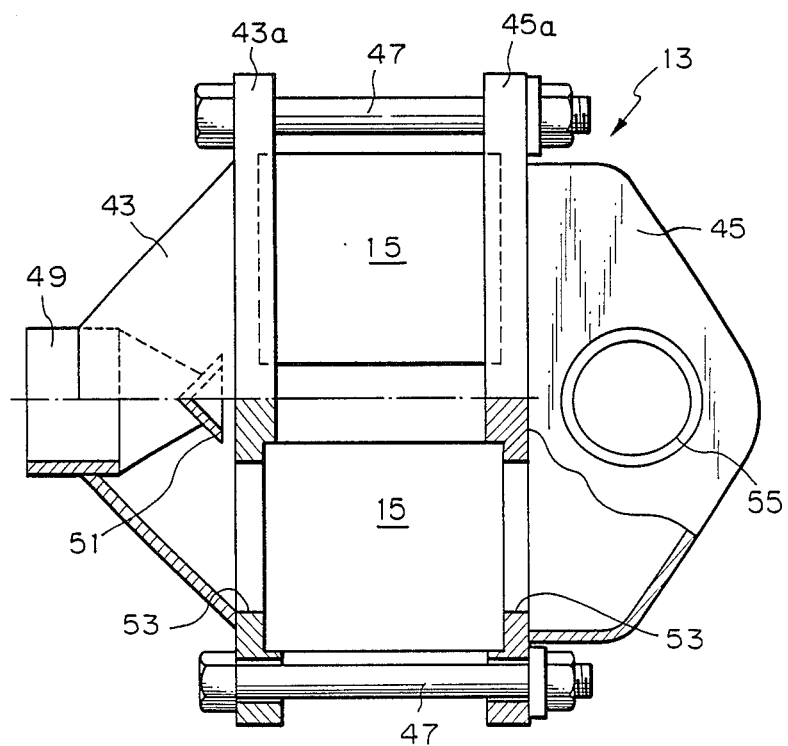
FIG. 5 is a partly-sectioned enlarged view of the trap employed in the apparatus shown in FIG. 1.

The ceramic trap member 31 thus constructed has a cushioning material 39 wound around it, as shown in FIG. 4, and this cushioning material 39 which may, for example, be a thermal expansion seal or a wire mesh, is further covered with a metallic casing 41 to form a complete trap assembly 15. As shown in FIG. 5, one or more (two in the illustrated example) trap assemblies 15 thus constructed are sandwiched between respective flanges 43a, 45a of inlet- and outlet-side manifold portions 43, 45 of an exhauster and secured by means of a plurality of nut-and-bolt assemblies 47 with the aid of spacers if necessary. Since the ceramic trap member 31 may readily crack, it needs to be surrounded by a cushioning material 39, for example, a thermal expansion seal or a wire mesh, in such a manner as to be isolated from vibration. However, since the cushioning material 31 will thermally expand during use of the apparatus, it is difficult to remove the ceramic trap member 31 from the casing 41 without breakage. In the present invention, therefore, the trap assembly 15 is arranged such that the ceramic trap member 31 is made replaceable together with the casing 41 as one unit, as illustrated, thus enabling improvements in both serviceability and maintenance. Further, since the ceramic trap member 31 is capable of being removed together with the casing 41, it is also possible to carry out regeneration outside the machine without difficulty. By appropriately varying the number of incorporated trap assemblies 15, it is possible to make the apparatus conform with any number of systems having different displacement volumes, from small-sized vehicles to large-sized vehicles. It should be noted that, in FIG. 5, the reference numeral 49 denotes an inlet pipe secured to the inlet-side manifold 43, 51 an exhaust gas dispersing plate secured to the inlet pipe 49, 53 openings respectively provided in the flanges 43 and 45a, and 55 an outlet pipe connected to the outlet-side manifold portion 45.

Figure 6B:
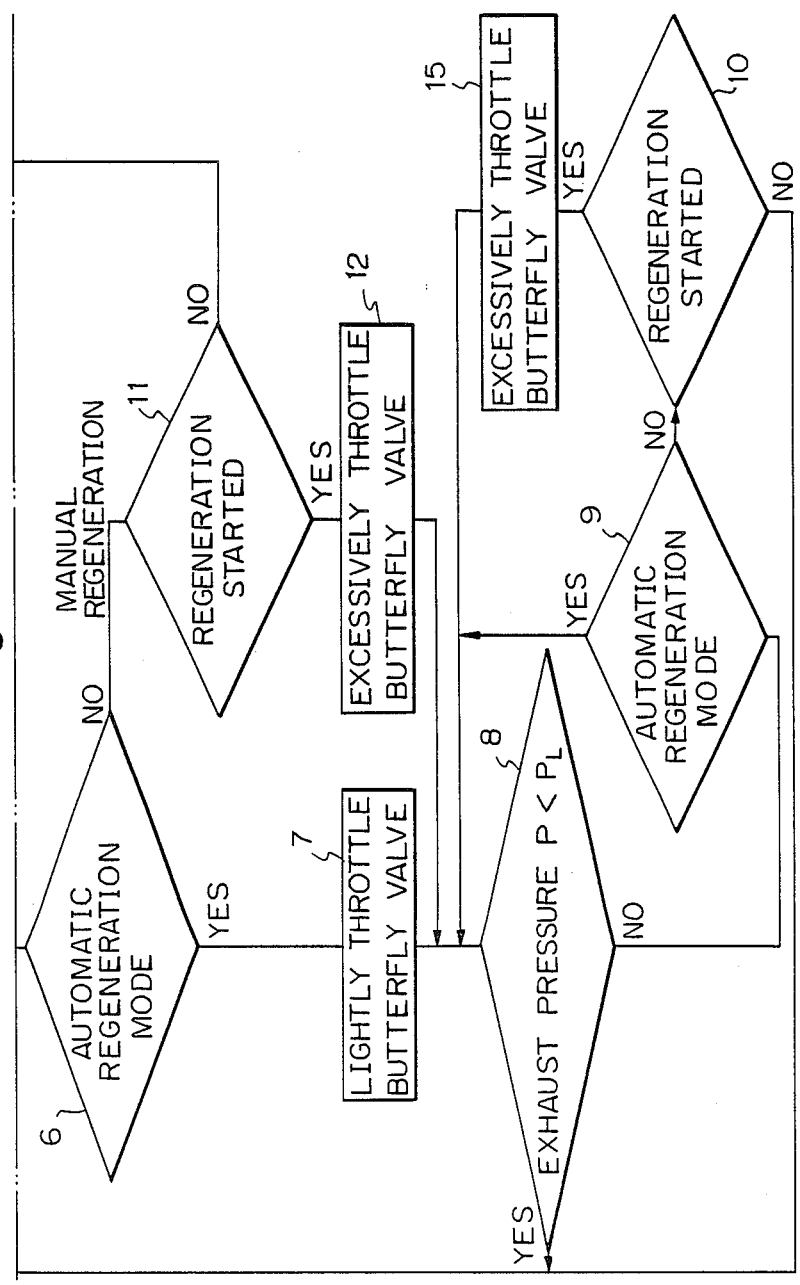
FIG. 6 is a flowchart showing the details of the regeneration control executed in the apparatus of the embodiment.
Figure 7:
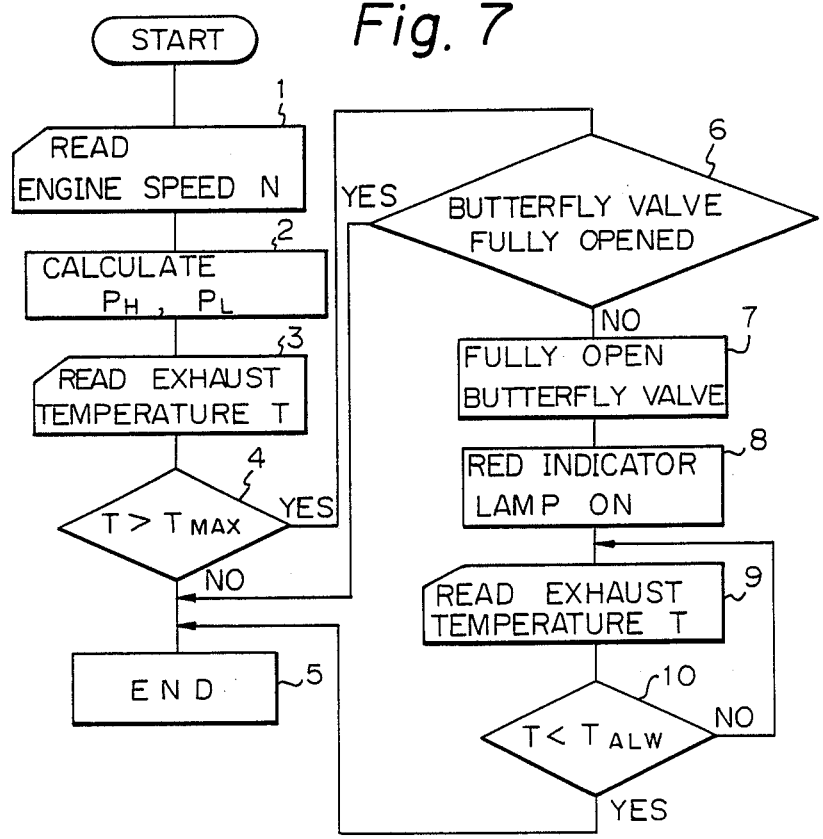
FIG. 7 is a flowchart showing the details of the temperature control executed in the apparatus of the embodiment.

FIGS. 6 and 7 are flowcharts showing details of the control carried out in the present invention. The operation of the method and apparatus according to the present invention will next be described in conjunction with the details of the control.

The control in the method and apparatus of the present invention includes both the regeneration control shown in FIG. 6 and the temperature control executed by a timer interruption which is shown in FIG. 7.

Figure 8:
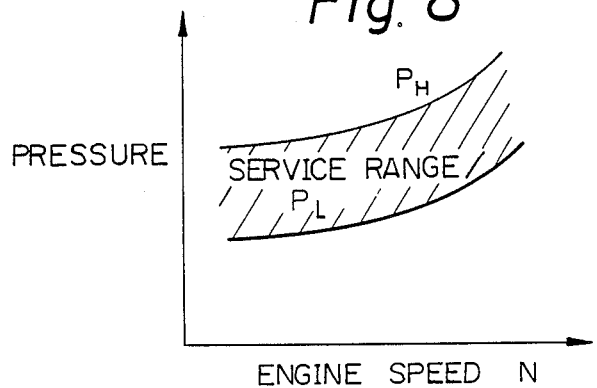
FIG. 8 is a graph showing the relationship between the engine speed and the specified pressure range.

In the regeneration control if the apparatus is started in the construction machine in its actual operation mode, the butterfly valve 5 is fully opened, and a green indicator lamp is turned on (Steps 1 and 2). The exhaust pressure P at the inlet of the trap 13 is compared with the lower-limit value $P_L$ of a specified pressure range which is calculated on the basis of the engine speed measured at that time. If the exhaust pressure P is equal to or less than the lower-limit value $P_L$, the valve 5 is kept fully opened and the green indicator lamp is also kept on (Step 14). If the exhaust pressure P exceeds the lower-limit value $P_L$ and if the controller has been set in the automatic regeneration mode through the mode changeover switch 25, the exhaust pressure P at the inlet of the trap 13 is compared with the higher-limit value $P_H$ of a specified pressure range which is calculated on the basis of the engine speed measured at that time. If the exhaust pressure P is equal to or less than the higher-limit value $P_H$, normal running continues with the green indicator lamp remaining on (Steps 3 and 4). The higher-limit value $P_H$, together with the lower-limit value $P_L$, is calculated in the controller 23 according to a predetermined equation on the basis of a value representing the engine speed which is output from the engine speed sensor 21 at predetermined intervals (see FIG. 8). In this normal running state, black smoke particles which are trapped in the trap 13 are burned by means of exhaust gas introduced into the trap 13 under the action of the aforementioned catalyst. It is often the case that the temperature of exhaust gas immediately ahead of the trap 13 exceeds 500° C in a construction machine in its actual operation mode. Therefore, black smoke particles are satisfactorily burned by means of the exhaust gas and there is substantially no possibility of the exhaust pressure P exceeding the higher-limit value $P_H$.

However, if the trap 13 becomes plugged with trapped black smoke particles due to, for example, continuation of a low-load running state for a long time, the exhaust pressure P rises and this lowers the engine performance appreciably. Then, in the present invention, the black smoke particles plugging the trap 13 are forcibly burned to thereby regenerate the trap 13.

More specifically, when the exhaust pressure P exceeds the higher-limit value $P_H$ (corresponding to an exhaust pressure which leads to an engine output reduction of, for example, about 5%), an orange indicator lamp is turned on and the actuator 7 is activated so that the butterfly valve 5 which is disposed in the intake system lightly throttles the intake (Steps 5, 6 and 7). Since this automatic regeneration is effected during actual operation of the construction machine, the butterfly valve 5 cannot be excessively throttled. As a result, the exhaust gas temperature within the trap 13 is raised and black smoke particles are thereby forcibly burned. As the forced combustion proceeds, the exhaust pressure P gradually lowers. When the pressure P is equal to or less than the lower limit value $P_L$ obtained on the basis of the current engine speed, the butterfly valve 5 is fully opened to return the engine to the normal running (Steps 8 and 1). For example, the lower-limit value $P_L$ may be set so as to correspond to an exhaust pressure resistance value measured when the trap 13 is not substantially plugged. When it is desired that the engine return to the normal running state during the forced combustion even if the exhaust pressure P has not yet dropped to the lower-limit value $P_L$, it will suffice to cancel the automatic regeneration mode (Steps 9, 10 and 1).

In the apparatus according to this embodiment, the above-described forced combustion can also be carried out with the construction machine stopped at a fixed position. In such a case, the controller 23 is changed over to the manual regeneration mode in a state wherein the exhaust pressure P is in excess of the lower-limit value $P_L$, and the operator then turns on the regeneration start switch 27 (Steps 6, 11, 9 and 10). More specifically, when the regeneration start switch 27 is turned on, the actuator 7 activates the butterfly valve 5 to throttle the intake excessively (Steps 12 and 15). As a result, the exhaust gas temperature is further raised (for example, to 550° C), so that the regeneration of the trap 13 is completed within a short period of time. The forced combustion is continued until the exhaust pressure P reaches the lower-limit value $P_L$. When the exhaust pressure P drops to the lower-limit value $P_L$ or less, the butterfly valve 5 is fully opened to return the engine to the normal running state (Steps 8 and 1). When it is desired to return the engine to the normal running state during the forced combustion, it will suffice to turn off the regeneration switch 27 (Steps 9, 10 and 1).

Even when the exhaust pressure P is not in excess of the higher-limit value $P_H$, it is possible to start forced combustion at any time (e.g., at the time of periodical inspection) so that the exhaust pressure P drops to the lower-limit value $P_L$. In such a case, the controller 23 is changed over to the manual regeneration mode and the operator turns on the regeneration switch 27. In consequence, the orange indicator lamp is turned on (Steps 3, 13 and 5), and the actuator 7 is activated so that the butterfly valve 5 performs excessive throttling of the intake (Steps 6, 11 and 12). In this case, the engine is returned to the normal running condition simply by turning off the regeneration switch 27 (Steps 13 and 4 or Steps 11 and 4).

FIG. 7 is a flowchart showing the exhaust gas temperature control which is executed by timer interruption during regeneration of the trap 13 in order to prevent overheating of the engine. More specifically, the controller 23 reads the engine speed N from the engine speed sensor 21 at predetermined intervals and calculates the higher-limit value $P_H$ and the lower-limit value $P_L$. Further, the controller 23 reads the current exhaust gas temperature T from the temperature sensor 19 and compares the exhaust gas temperature T with a preset maximum-limit temperature $T_{MAX}$ (Steps 1, 2, 3 and 4). When the exhaust gas temperature T is equal to or less than the maximum-limit temperature $T_{MAX}$, the control is ended (Step 5). When the exhaust gas temperature T exceeds the maximum-limit temperature $T_{MAX}$, the process proceeds to Step 6 in which it is judged whether or not the butterfly valve 5 is fully opened or not. If YES, the control is ended (in this case, an additional control, for example, one for stopping the vehicle, is effected), whereas, if NO is the answer in Step 6, the butterfly 5 is fully opened and, at the same time, a red indicator lamp is turned on (Steps 7 and 8). Further, the exhaust gas temperature T is read and compared with a preset allowable temperature $T_{ALW}(T_{ALW}<T_{MAX})$ (Steps 9 and 10). When the exhaust gas temperature T is equal to or less than the allowable temperature $T_{ALW}$, the control is ended (Step 5).

Although in the foregoing embodiment the automatic and manual regeneration modes are made interchangeable with each other to thereby enable regeneration to be effected in either an operative or inoperative state of the construction machine, the automatic regeneration mode alone may be employed in the present invention. Also, although in the described embodiment the butterfly valve is controlled in response to signals from the pressure and temperature sensors associated with the trap, the present invention is not necessarily limited thereto, and the butterfly valve may be controlled in response to a signal from the pressure sensor alone. Further, although in the embodiment described a specified exhaust pressure range in the trap is calculated on the basis of the engine speed alone, it can be calculated on the basis of both engine speed and engine boost pressure as measured at a given time, which enables the specified pressure range to represent the actual load of the engine more precisely.

As has been described above, the present invention enables black smoke particles t o be controllably burned by means of exhaust gas without causing any engine trouble and, therefore, enable to realize an actual engine smoke reducing system in an actual vehicle. In addition, since the trap can be regenerated with the ceramic trap assemblies left incorporated in the construction machine, it is possible to provide a diesel engine smoke reducing apparatus which is superior in both serviceability and durability.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A method of reducing smoke emitted from a diesel engine, comprising: disposing a trap for trapping black smoke particles in an exhaust system of said engine, said trap including a ceramic trap assembly having a honeycomb structure in which a catalyst which enables lowering of the combustion temperature of black smoke is carried on internal passage walls; providing a pressure sensor at the inlet of said trap; and controlling the combustion rate of black smoke particles in said trap in such a manner that a specified exhaust pressure range in said trap is obtained on the basis of an engine speed signal from an engine speed sensor, a value representing the exhaust pressure supplied by said pressure sensor is compared with said specified exhaust pressure range, and when the exhaust pressure inside said trap exceeds the higher-limit value of said specified exhaust pressure range, a butterfly valve in an intake system of said engine is throttled, whereas when the exhaust pressure is equal to or less than the lower-limit value of said specified exhaust pressure range, said butterfly valve is fully opened, wherein the control of the degree of opening of said butterfly valve is alternatively conducted in either one of the automatic and manual regeneration modes such that, in said automatic regeneration mode, said butterfly valve is lightly throttled, whereas in said manual regeneration mode, said butterfly valve is throttled to a greater degree than in the automatic mode.

2. The method of claim 1, wherein a temperature sensor is provided at the inlet of said trap, the value of a temperature supplied by said temperature sensor is compared with a preset maximum-limit temperature at predetermined intervals, and when the temperature inside said trap exceeds said maximum-limit temperature, said butterfly valve is fully opened.

3. The method of claim 2, wherein a temperature signal from said temperature sensor is compared with a preset allowable temperature, and said butterfly valve is maintained at its full open position until the temperature inside said trap drops to said allowable temperature or less.

4. The method of claim 1, wherein said catalyst is either a precious metal or a base metal catalyst.

5. An apparatus for reducing smoke emitted from a diesel engine, comprising: a trap for trapping black smoke particles which is disposed in an exhaust system of said engine, said trap including a ceramic trap assembly having a honeycomb structure in which a catalyst which enables lowering of the combustion temperature of black smoke is carried on internal passage walls; a pressure sensor provided at the inlet of said trap; on engine speed sensor; a butterfly valve provided in an intake system of said engine; a combination of a controller and an actuator arranged to obtain a specified exhaust pressure range in said trap on the basis of a signal from said engine speed sensor, compares an exhaust pressure signal from said pressure sensor with said specified exhaust pressure range, and control the degree of opening of said butterfly valve such that when the exhaust pressure inside said trap exceeds the higher-limit value of said specified exhaust pressure range, said butterfly valve is throttled, whereas when the exhaust pressure is equal to or less than the lower-limit value of said specified exhaust pressure range, said butterfly valve is fully opened, the control of the degree of opening of said butterfly valve being capable of being alternatively conducted in either one of the automatic and manual regeneration modes and said butterfly valve being lightly throttled in said automatic regeneration mode whereas said butterfly valve is throttled in said manual regeneration mode to a greater extent than in said automatic mode, and an indicator for indicating the exhaust pressure state of said trap.

6. The apparatus of claim 5, further comprising a temperature sensor provided at the inlet of said trap, said combination of the controller and the actuator being arranged to compare a temperature signal from said temperature sensor with a preset allowable temperature at predetermined intervals and control the degree of opening of said butterfly valve so that the temperature inside said trap is maintained at the allowable temperature or less.

7. The apparatus of claim 6, wherein said indicator indicates the temperature state of said trap.

8. The apparatus of claim 5, wherein said catalyst is either a precious metal or a base metal catalyst.

9. The apparatus of claim 5, wherein said ceramic trap assembly comprises a ceramic trap member, a cushioning material covering the periphery of said ceramic trap member, and a metallic casing covering said cushioning material.

10. The apparatus of claim 9, wherein said trap includes a plurality of said ceramic trap assemblies which are detachably mounted between an inlet-side manifold portion and an outlet-side manifold portion of an exhauster.

* * * * *